March 6, 1928.

H. JUNKERS 1,661,183

WALL FORMING MEMBER

Filed March 30, 1927

Inventor:
Hugo Junkers
by Kimahatter
Atty.

Patented Mar. 6, 1928.

1,661,183

UNITED STATES PATENT OFFICE.

HUGO JUNKERS, OF DESSAU, GERMANY.

WALL-FORMING MEMBER.

Application filed March 30, 1927, Serial No. 179,531, and in Germany April 3, 1926.

My invention refers to wall and roof structures and more especially to a wall-forming member of favourable properties, which is particularly adapted for use in the construction of walls, roofs and the like, inasmush as in spite of its comparatively low thickness and weight per unit of surface it is distinguished by considerable mechanical strength, good insulation capacity against heat, absolute impermeability to moisture and air and which further offers the advantage of being specially adapted to be manufactured in standard sizes.

In view of these valuable properties the new member is particularly suitable for the construction of roofings, more especially in those cases where losses of heat must be avoided as far as possible.

The new member according to the present invention is composed of a plurality of layers, including a metal skin, a heat insulating layer and a layer of hardened plastic mineral matter superposed on the heat insulating layer. The metal skin is provided in order to render the member absolutely impermeable to air and moisture. The heat insulating layer may consist for instance of compressed peat or some other suitable porous material. The mineral layer is composed of a mass, such as lime mortar, cement mortar, concrete or the like, which can easily be spread on the insulating layer and on hardening is converted into a stone-like mass. This mortar layer is intended to protect the heat insulating layer and to cooperate with the metal skin in rendering the member mechanically resisitive and rigid. If desired, a further thin layer can be arranged on the mortar layer in order to render this latter altogether watertight or smooth, such smoothening layer being also adapted to diminish heat radiation.

Obviously a wall-forming member of this kind can easily be manufactured in standard sizes which can then be secured in place to form a wall, roofing or the like. I can however, also provide standard-sized members consisting merely of the metal skin and insulating layer, the mortar layer being produced only in situ on the members after they have been assembled to form the wall or roof. This offers the advantage that while the wall or roof is composed of a plurality of easily manufactured and conveyed units, there is still present a continuous covering layer which ensures absolute impermeability and in many cases also a better outward appearance. If a continuous mortar layer is provided, joints may be provided for expansion.

In the drawings affixed to this specification and forming part thereof several modifications of a structure or member embodying my invention are illustrated diagrammatically by way of example.

In the drawings,

Fig. 1 is a cross section of one such member, while

Figure 1:
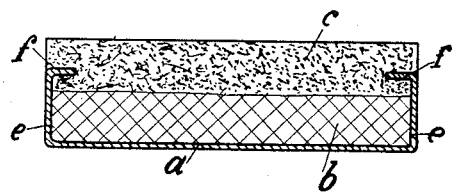

Referring first to Fig. 1, $a$ is the outer metal skin formed of a sheet metal channel, the flanges $e$ of which are bent inwards at right angles at $f$. The metal channel $a$ is filled partly with a suitable heat insulating material, this layer $b$ consisting of compressed peat or the like. Above the layer $b$ is arranged a layer $c$ of concrete or the like, which fills part of the channel $a$ and surmounts same so that the inwardly turned edges $f$ of the flanges $e$ of the channel are embedded in the concrete layer $c$.

Obviously a member such as shown in Fig. 1 forms a self-contained unit of great mechanical strength and which possesses all the properties above described and can be manufactured in standard sizes for direct combination with other members of a similar kind.

Figure 2:
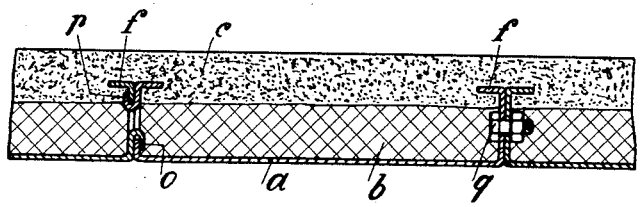
Fig. 2 is a similar view of a plurality of members, composed only of a metal skin and heat insulating layer which are juxtaposed and fixed to each other with a continuous mortar layer superposed onto them.

As shown in Fig. 2, instead of providing standard members comprising three layers, I can also manufacture such members in two layers, the metal skin $a$ and heat insulating layer $b$, the mortar layer being arranged on the assembled members as a continuous body as shown at $c'$ in Fig. 2. Here are also shown different ways of connecting adjacent members. In the right-hand half of Fig. 2 is shown a connection by means of screw bolts $q$ which project across the adjoining flanges, while in the left-hand half is shown a connection by means of tongues o and p stamped out in the adjoining flanges, each tongue being bent so as to project across the punched hole in the flange of the adjoining member.

Figure 3:
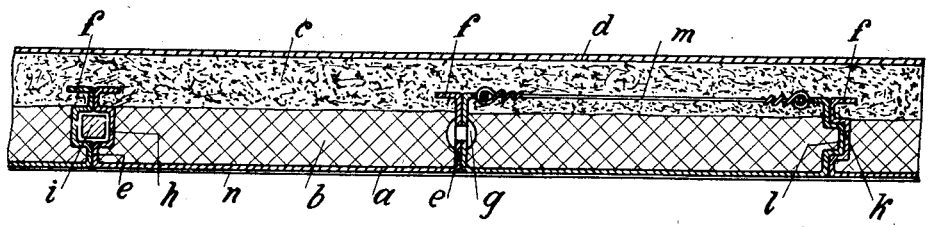
Fig. 3 is a similar view of a plurality of juxtaposed members, fixed to each other and which are covered by a continuous layer of mortar or the like and an also continuous layer of some suitable smoothening material.

In Fig. 3 are shown several juxtaposed members which are prevented from being displaced relative to each other by means of rivets g or by means of a key and slot connection l and k or by notching adjoining flanges, as at h and inserting in adjoining notches metal keys such as i. In the continuous concrete layer covering all these members can be embedded reinforcing wires m fixed to the inwardly bent portons f of the flanges, and on the concrete layer can be arranged a protective layer d of some suitable kind, while a fifth continuous layer n may cover the metal skins.

The metal skin having the form of a channel serves as a protection for the insulating layer b during transport and further facilitates the assembling of the members. The mechanical strength of the wall or roof thus constructed is greatly increased by the inwardly projecting parts f of the flanges e of the channel. It is important that no part of the metal skin extends on the outside of the layers c and d, whereby a conduction of heat would be created between the inner and outer surfaces of the wall.

Obviously the metal skin may form either the inner or the outer surface of the wall or roofing. In roofings the metal skin will be preferably placed at the bottom in order to serve as a support for the insulating and concrete layers.

The metal skin can further be covered with other layers, such as shown at n in Fig. 3, consisting of wood, linoleum or the like, and further layers may cover the concrete layer c or layer d.

I wish it to be understood that I do not desire to be limited to the exact details of construction shown and described, for obvious modifications will occur to a person skilled in the art.

I claim:—

1. Wall-forming member comprising a metal skin, a heat insulating layer and a layer of hardened, plastic, mineral matter on said heat insluating layer.

2. Wall-forming member comprising a metal skin, a heat insulating layer, a layer of hardened, plastic, mineral matter on said heat insulating layer and a watertight skin on said mineral layer.

3. Wall structure comprising a plurality of edgewise assembled members, each comprising a metal skin and a heat insulating layer, and a layer of hardened, plastic, mineral matter covering the heat insulating layers of all said members.

4. Wall structure comprising a plurality of edgewise assembled members, each comprising a metal skin and a heat insulating layer, and a layer of hardened, plastic, mineral matter and a watertight skin covering the plastic mineral layers of all said members.

5. Wall-forming member comprising a metal skin, a heat insulating layer and a layer of hardened, plastic, mineral matter on said heat insulating layer, said metal skin extending across the lateral edges of said heat insulating layer and into said mineral layer.

6. Wall structure comprising a plurality of edgewise assembled members, each comprising a metal skin and a heat insulating layer, and a layer of hardened, plastic mineral matter covering the heat insulating layers of all said members, the metal skins of all said members extending across the lateral edges of said heat insulating layers and into said mineral layer and a mechanical connection between adjoining portions of said metal skins.

7. Wall structure comprising a plurality of edgewise assembled members, each comprising a metal skin and a heat insulating layer, and a layer of hardened, plastic, mineral matter, covering the heat insulating layers of all said members, the metal skins of all said members extending across the lateral edges of said heat insulating layers and into said mineral layer and means in contact with said metal skins for preventing relative displacement.

8. Wall-forming member comprising a metal skin, a heat insulating layer and a reinforced layer of hardened, plastic, mineral matter on said heat insulating layer.

9. Structural wall-forming member comprising a sheet metal channel, a layer of heat insulating material covering the middle web of said channel and a hardened, plastic, mineral layer in said channel on top of said heat insulating layer.

10. Structural wall-forming member comprising a sheet metal channel, a layer of heat insulating material covering the middle web of said channel and a concrete layer in said channel on top of said heat insulating layer.

11. Structural wall-forming member comprising a sheet metal channel, a layer of heat insulating material covering the middle web of said channel and a reinforced concrete layer in said channel on top of said heat insulating layer.

12. Structural wall-forming member comprising a sheet metal channel, a layer of heat insulating material covering the middle web of said channel and a concrete layer in said channel on top of said heat insulating layer, angular extensions of the channel walls extending into said concrete layer.

13. Wall forming member comprising a metal skin, a heat insulating layer and a layer of hardened, plastic, mineral matter on said heat insulating layer, said metal skin being so shaped as to extend over part of the height of the lateral edges of the member but not to the opposite side thereof.

14. Wall forming member comprising a metal skin, a heat insulating layer and a layer of hardened, plastic, mineral matter on said heat insulating layer, said metal skin being so shaped as to extend over part of the height of the lateral edges of the member, the borders of the metal skin being fixed to the said mineral layer.

In testimony whereof I affix my signature.

HUGO JUNKERS.